US012638756B2

(12) United States Patent
Tang et al.

(10) Patent No.: US 12,638,756 B2
(45) Date of Patent: May 26, 2026

(54) ADJUSTABLE ARCHWAY SYSTEM WITH INTEGRATED LIGHTING, PIVOT JOINTS, AND PATTERNED DESIGN

(71) Applicant: Copart, Inc., Dallas, TX (US)

(72) Inventors: Victor Tang, Flower Mound, TX (US);
Priyam Dalwadi, Dallas, TX (US);
Christopher Deleon, Dallas, TX (US);
William An, Waxahachie, TX (US);
Nikhil Kadalge, Dallas, TX (US);
Raveena Jadhav, Dallas, TX (US);
Mikhail Malakhvei, Allen, TX (US)

(73) Assignee: Copart, Inc., Dallas, TX (US)

( * ) Notice: Subject to any disclaimer, the term of this patent is extended or adjusted under 35 U.S.C. 154(b) by 0 days.

(21) Appl. No.: 19/235,128

(22) Filed: Jun. 11, 2025

(65) Prior Publication Data

US 2026/0010060 A1     Jan. 8, 2026

Related U.S. Application Data

(60) Provisional application No. 63/667,451, filed on Jul. 3, 2024.

(51) Int. Cl.
*G03B 17/56* (2021.01)
*H04N 23/70* (2023.01)

(52) U.S. Cl.
CPC ........... *G03B 17/561* (2013.01); *H04N 23/70* (2023.01)

(58) Field of Classification Search
CPC ...... G03B 17/561; H04N 23/70; G01N 21/01; G01N 21/88; G01N 21/8803; G01N 21/8851; G01N 2021/8841; G01N 2021/8887
See application file for complete search history.

(56) References Cited

U.S. PATENT DOCUMENTS

| | | |
|---|---|---|
| 2005/0231388 A1 | 10/2005 | Suggs, Sr. |
| 2018/0012350 A1 | 1/2018 | Gangitano et al. |
| 2021/0090242 A1 | 3/2021 | Hever et al. |
| 2021/0396684 A1 * | 12/2021 | Tissandier ......... G01N 21/8806 |
| 2022/0082723 A1 | 3/2022 | Song et al. |
| 2022/0311951 A1 * | 9/2022 | Leung .................... G06Q 40/08 |

FOREIGN PATENT DOCUMENTS

| | | | |
|---|---|---|---|
| CN | 117830177 A * | 4/2024 | ............. G06N 3/096 |

OTHER PUBLICATIONS

Patent Cooperation Treaty: International Search Report and Written Opinion of PCT/US2025/033208 (related application); Harry Kim; Aug. 21, 2025; 11 Pages.

* cited by examiner

*Primary Examiner* — Stephanie E Bloss
*Assistant Examiner* — Fang-Chi Chang

(57) ABSTRACT

An adjustable archway system comprises a main frame defining an archway through which a vehicle may pass. An extension mechanism integrated within the main frame is configured to adjust a height and width of the main frame to a plurality of positions. A plurality of cameras are mounted the main frame for capturing images of the vehicle passing through the archway of the main frame. A controller is configured to operate the extension mechanism to move between the plurality of positions of the main frame.

19 Claims, 6 Drawing Sheets

402

404

ADJUSTABLE ARCHWAY SYSTEM WITH INTEGRATED LIGHTING, PIVOT JOINTS, AND PATTERNED DESIGN

CROSS-REFERENCE TO RELATED APPLICATIONS

This application claims benefit of U.S. Provisional Application No. 63/667,451, filed Jul. 3, 2024, entitled ADJUST-ABLE ARCHWAY SYSTEM WITH INTEGRATED LIGHTING, PIVOT JOINTS, AND PATTERNED DESIGN (Atty. Dkt. No. CPRT60-35954), the specifications of which are incorporated by reference herein in their entirety.

TECHNICAL FIELD

The present invention relates to system for scanning vehicles for damages, and more particularly to an adjustable archway system including integrated lighting and patterned design for scanning vehicles for damages.

BACKGROUND

Conventional archways are typically static, fixed structures that do not accommodate different vehicles of varying heights and widths. This would require the use of different archway designs to accommodate different vehicle types and sizes. This would lead to inefficiencies and increased construction costs due to the requirements for varied sizes of archways. Thus, an archway for vehicle scanning that was adjustable based upon vehicle size or location of use would be of great benefit.

SUMMARY

The present invention, as disclosed and described herein, in one aspect thereof, comprises an adjustable archway system including a main frame defining an archway through which a vehicle may pass. An extension mechanism integrated within the main frame is configured to adjust a height and width of the main frame to a plurality of positions. A plurality of cameras are mounted the main frame for capturing images of the vehicle passing through the archway of the main frame. A controller is configured to operate the extension mechanism to move between the plurality of positions of the main frame.

BRIEF DESCRIPTION OF THE DRAWINGS

For a more complete understanding, reference is now made to the following description taken in conjunction with the accompanying Drawings in which.

DETAILED DESCRIPTION

Figure 1:
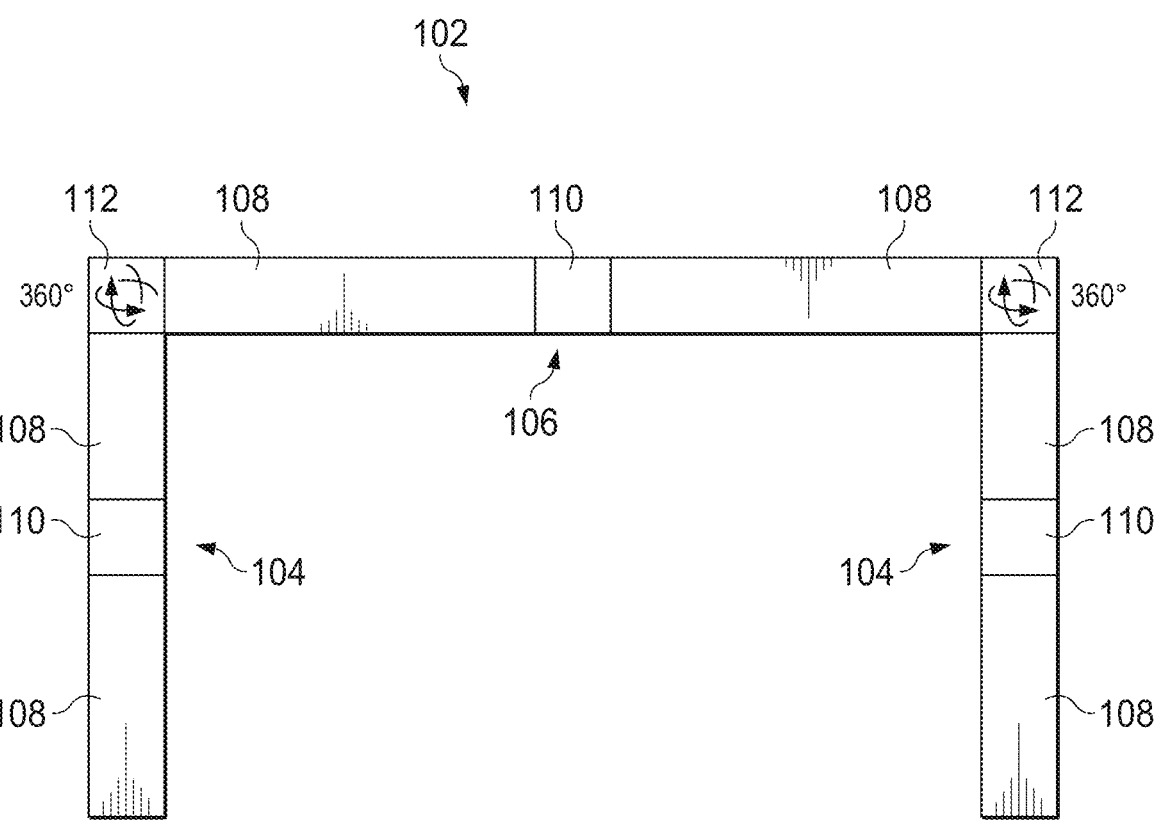
FIG. 1 illustrates an end view of an adjustable archway for scanning a vehicle for damage.

Referring now to the drawings, wherein like reference numbers are used herein to designate like elements throughout, the various views and embodiments of an adjustable archway system with integrated lighting, pivot joints and patterned design are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2:
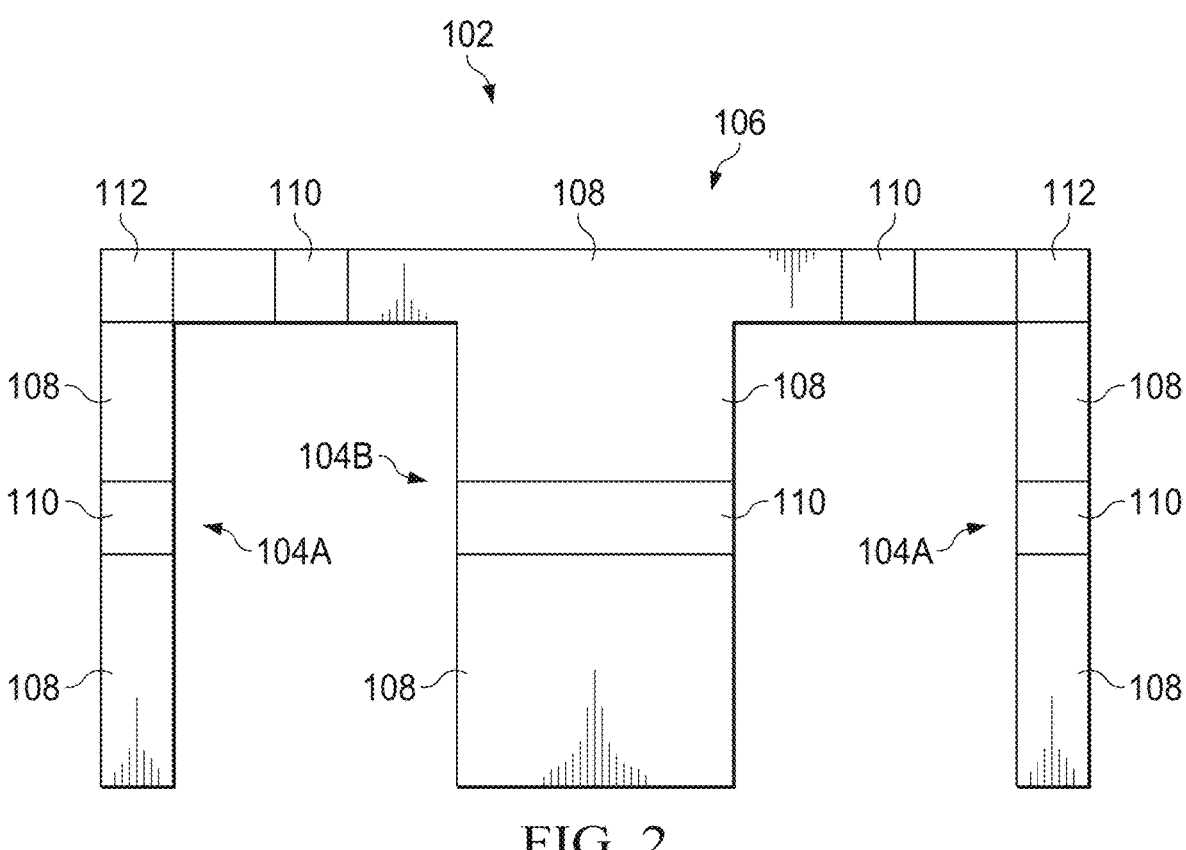
FIG. 2 illustrates a side view of an adjustable archway for scanning a vehicle for damage.

Referring now to the drawings, and more particularly to FIGS. 1 and 2, there is illustrated an end view (FIG. 1) and a side view (FIG. 2) of an adjustable archway system 102. The adjustable archway system 102 comprises a mainframe forming the base of the archway for supporting cameras, light sources, and vertical lines for deflectometry processing. The mainframe of the adjustable archway system 102 includes a plurality of vertical members 104 that are interconnected by one or more horizontal members 106. The vertical members 104 consist of member segments 108 that are interconnected by an extension mechanism 110. The adjustable archway system 102 additionally includes at least one horizontal member 106 comprising members segments 108 that are also interconnected via extension mechanisms 110. The horizontal members 106 and vertical members 104 are interconnected via pivot joints 112. The frame of the adjustable archway system 102 may be constructed from durable metal or some other type of structurally stiff and durable material.

The extension mechanism 110 is integrated between members segments 108 of the mainframe to enable the vertical members 104 to be smoothly and precisely adjusted in the vertical direction to accommodate different heights of vehicles and enable placement of the adjustable archway system 102 in different height areas. The extension mechanism 110 is also integrated between member segments 108 of the horizontal members 106 to enable the horizontal members to be smoothly and precisely adjusted in the horizontal direction to accommodate different widths of vehicles and enable placement of the adjustable archway system 102 in different width areas.

Figure 3:
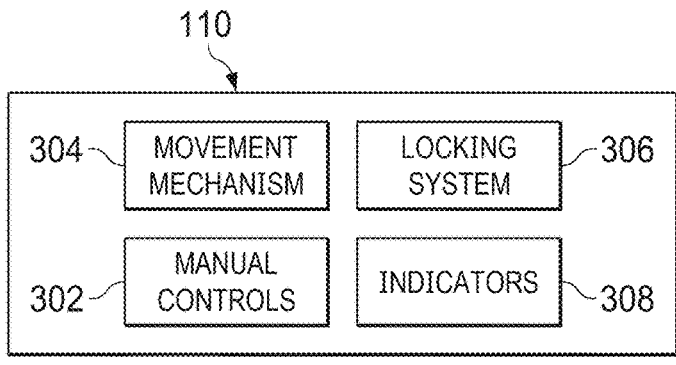
FIG. 3 illustrates a block diagram of an extension mechanism.

Referring now to FIG. 3, there is illustrated a block diagram of the extension mechanism 110 used in the horizontal members 106 and vertical members 104. The extension mechanism 110 includes manual controls 302, movement mechanism 304, a locking system 306 and indicators 308. The manual controls 302 enable the vertical members 104 to be extended vertically and the horizontal members 106 to be extended horizontally. The manual controls 302 may comprise some type of actuator that when pressed causes the extension or retraction of the vertical member 104 or the horizontal member 106. While the manual controls 302 may comprise a mechanical actuator located directly on the adjustable archway system 102, in other embodiments the manual controls 302 may wirelessly connect with the adjustable archway system in order to alter the dimensions thereof. The movement mechanism 304 comprises a mechanical apparatus that allows for the extension and retraction of the vertical members 104 and horizontal members 106.

The locking system 306 enables locking of the adjustable archway system 102 into a fixed position. Once the height and width of the adjustable archway system 102 is established, the locking system 306 locks the position of the adjustable archway system to prevent its movement during vehicle scanning. The dimension indicators 308 comprise a visual indication of the current height and width of the adjustable archway system 102 to assist a user in establishing the dimensions of the adjustable archway system using the manual controls 302. The indicators 308 may indicate the size of the opening defined by the position of the horizontal members 106 and vertical members 104 of the archway system 102 and/or the overall height and width of the adjustable archway. Thus, the adjustable archway system 102 may be set to a predetermined height and predetermined width by manipulating the manual controls 302 and looking for the appropriate values to be indicated by the indicators 308.

The pivot joints 112 allow for additional movement and control over the adjustable archway system 102 position and provides greater flexibility in adjusting the height and width of the archway. The pivot joints 112 are configured to enable the adjustable archway system 102 to move both vertically and horizontally and provide flexibility in archway positioning. The adjustable archway system 102 provides a truss system wherein the pivot joints 112 enable adjustments in multiple directions by enabling 360 degree movement of the pivot joints 112 between the vertical member 104 and the horizontal member 106. The pivot joints 112 allow the structure to extend vertically to accommodate taller vehicles and retract horizontally to fit narrower spaces. This also helps with portability, making the adjustable archway system 102 easier to move and reposition to different areas as needed.

FIG. 2 illustrates a side view of the adjustable archway system 102. FIG. 2 illustrates three groups of vertical members 104 making up the adjustable archway system 102. The vertical members 104A are located at opposite ends of the adjustable archway system 102. The vertical member 104B is located at the center of the adjustable archway system 102 and has a greater width in order to incorporate a lighting system and a vertical line structure as will be more fully described herein below. It will be appreciated that each of the vertical members 104 may have a greater width in order to accommodate incorporation of the lighting and vertical line structure for image capture. Additionally, a greater or lesser number of vertical members 104 may be incorporated within any particular adjustable archway system 102. The remaining components illustrated in the side view of the adjustable archway system 102 are similar to those discussed with respect to FIG. 1.

Figure 4:
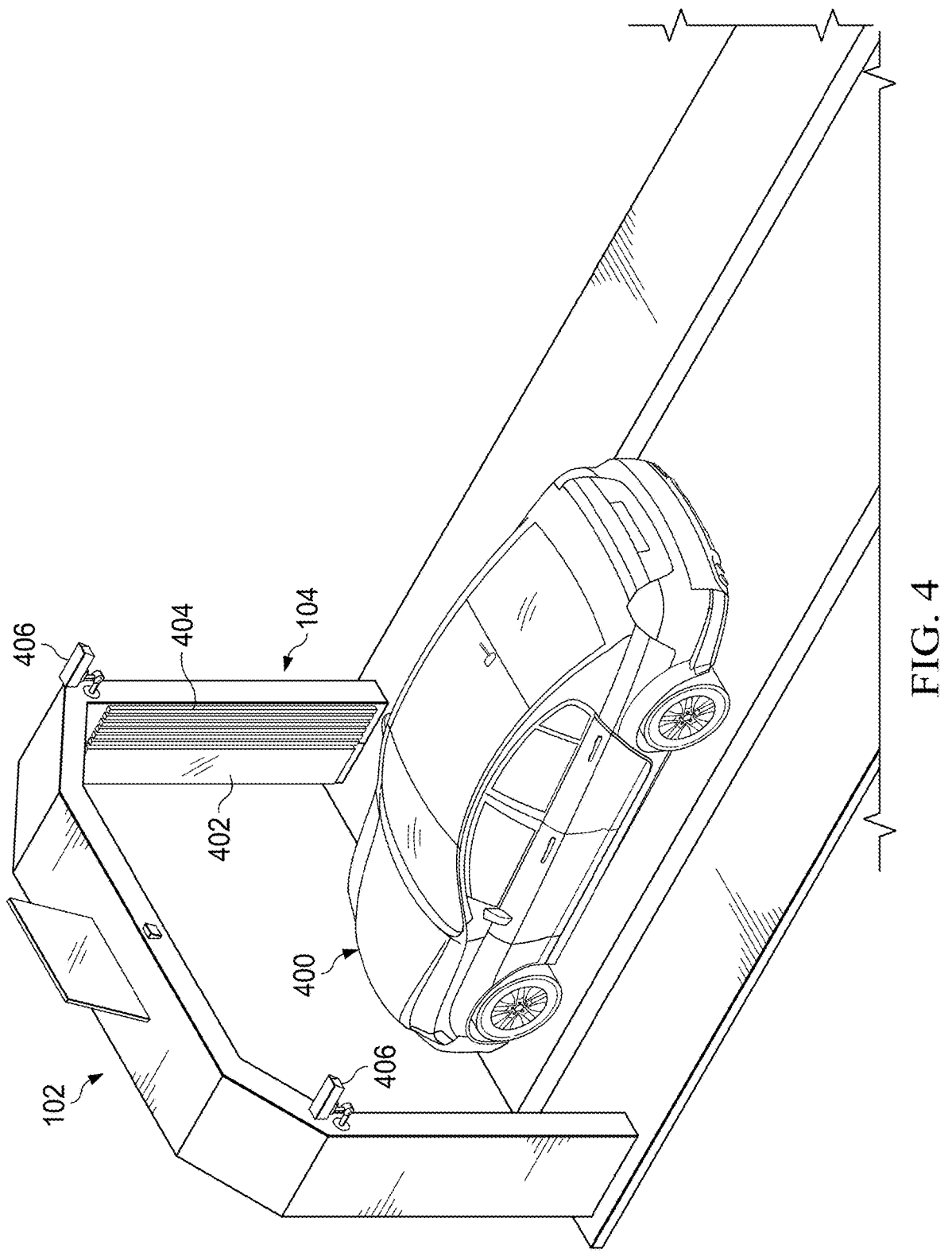
FIG. 4 illustrates a perspective view of an adjustable archway and the damage detection section.

Referring now to FIG. 4, there is illustrated a vehicle 400 driving through an adjustable archway system 102. The adjustable archway system 102 includes vertical members 104 that include a light source 402 and vertical lines 404. The integrated light source 402 is positioned throughout the adjustable archway system 102 to enable reflection of the vertical lines 404 onto reflective surfaces of a vehicle 400 to enable effective damage detection using deflectometry image analysis. Deflectometry image analysis analyzes the images of the vertical lines reflected on the surfaces of the vehicle 400 to locate damage such as dents, scratches and other damages on the vehicle. A series of cameras 406 are also placed at strategic locations upon the adjustable archway system 102 to enable capturing of the images of the vertical lines 404 that are reflected from the reflective surfaces of the vehicle 400.

Figure 5:
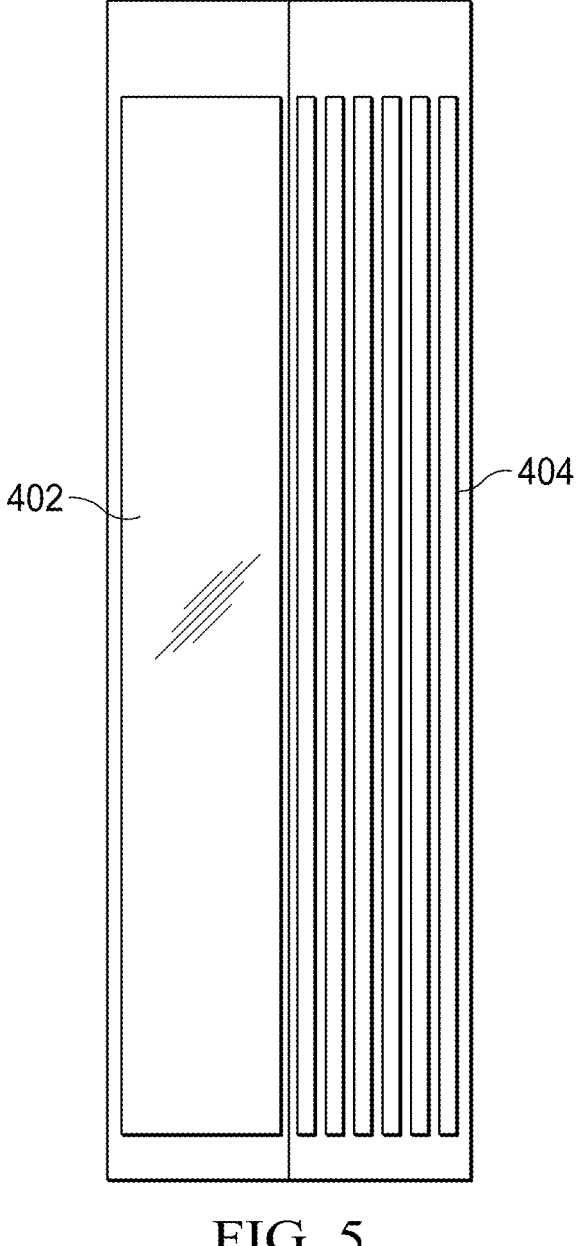
FIG. 5 illustrates a side view of the lighting and vertical reflecting lines of the damage detection section.

Referring now also to FIG. 5, there is illustrated a side view of the light source 402 and the vertical lines 404. The light source 402 comprises an adjustable light source that may illuminate the reflective surfaces of a vehicle 400 to varying degrees depending upon current lighting conditions. The vertical lines 404 comprise one-half of the vertical member 104 and comprise a series of parallel vertical lines used in deflectometry image analysis. The vertical lines 404 are applied using weather resistant techniques on fabric, acrylic or similar materials so that the vertical lines 404 are maintained on the archway system 102 in all weather conditions. The material including the vertical lines 404 may then be affixed to the appropriate half of the vertical member 104 of the adjustable archway system 102. The image of the provided vertical lines 404 reflect off of the reflective surfaces of the vehicle 400 that is being scanned as it passes through the archway 102.

The vertical lines 404 on one-half of the vertical member 104 are used by deflectometry image analysis in order to detect damage, scratches and other surface issues on the body of the vehicle. Deflectometry image analysis is an image analysis process used for surface damage detection. One example of deflectometry image analysis is described in "Deflectometry for Specular Surfaces: an Overview," *Advanced Optical Technologies*, Jul. 25, 2023, which is incorporated herein by reference in its entirety. This is only one example of deflectometry image analysis, and it will be appreciated that other types of deflectometry image analysis may be used.

Figure 6:
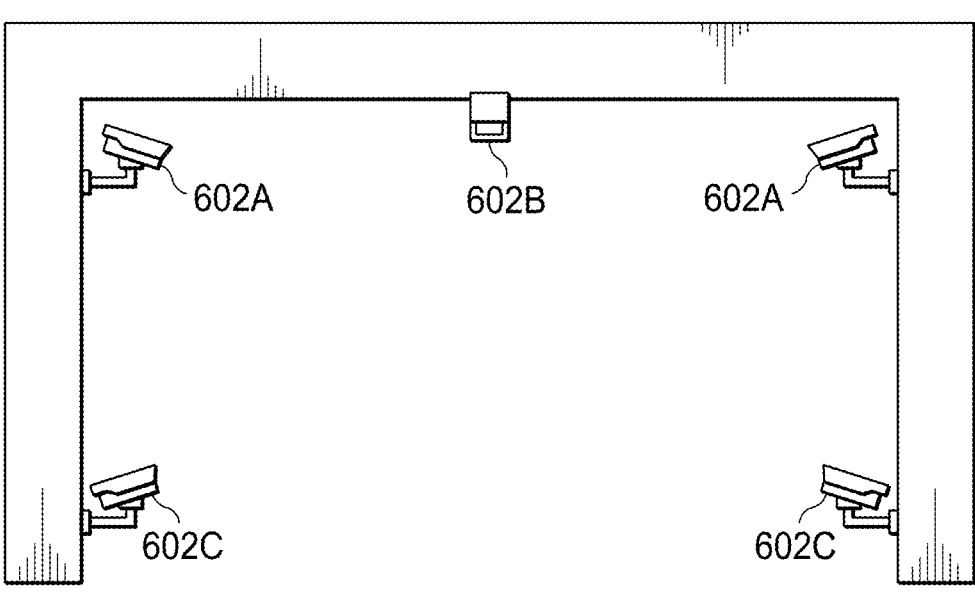
FIG. 6 illustrates various camera placements for the adjustable archway.

Referring now to FIG. 6, there are illustrated the various placements of cameras 602 within the adjustable archway system 102. Cameras 602A are positioned on both sides of the archway system diagonally from the top corners. Cameras 602B are also placed directly above to capture comprehensive views of the vertical line image patterns reflected off of the vehicle surface and labels placed on the vehicle for identification purposes. Finally, cameras 602C can be placed to capture detailed images of a vehicle's tires. Using models trained to detect and analyze tire conditions with an unwrapping algorithm, the images from the cameras 602C can be used to determine the current condition of the tire. The camera 602B can also be used to detect when a vehicle 400 exits the adjustable archway system 102 to enable a notification that vehicle scanning has been completed.

Figure 7:
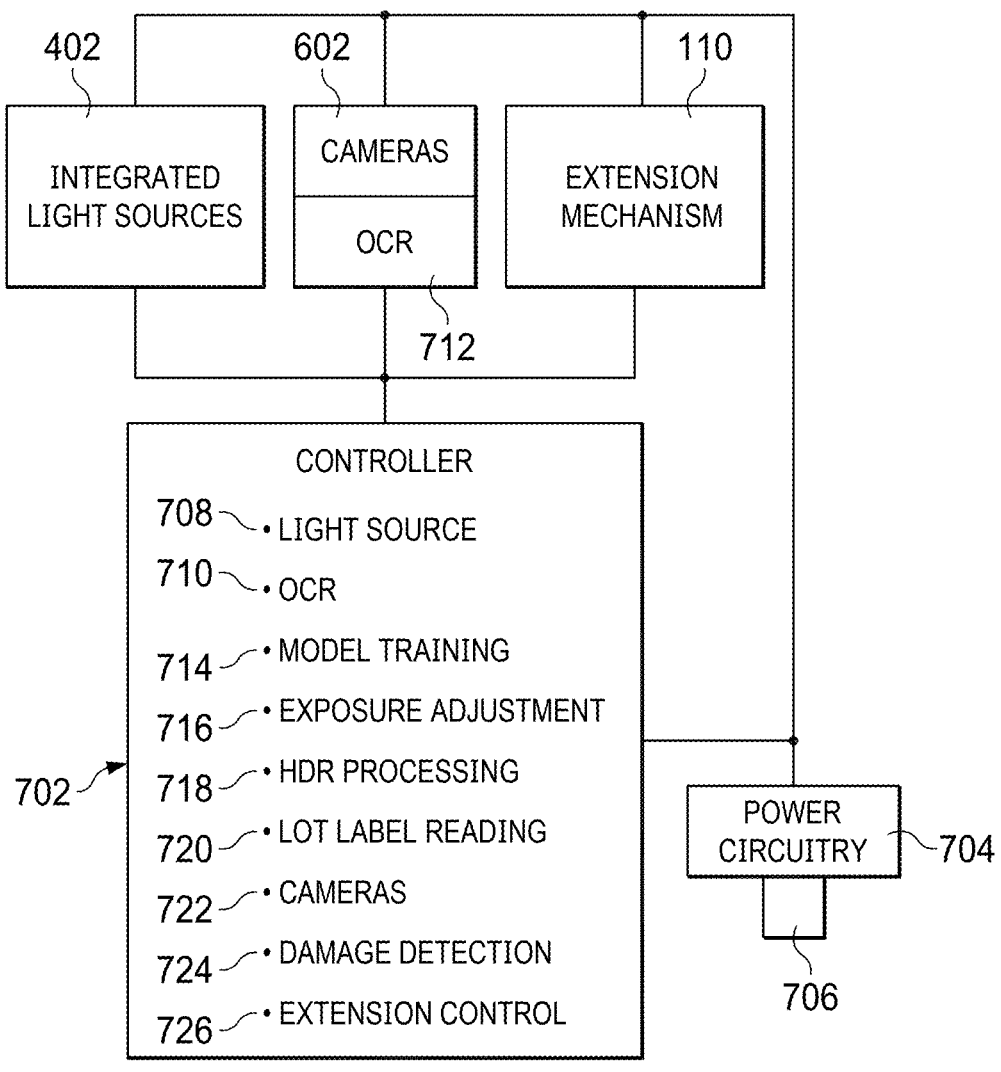
FIG. 7 illustrates a block diagram of the control system for the adjustable archway for scanning a vehicle for damage.

Referring now to FIG. 7, there is illustrated a block diagram of the system controller 702 for controlling operation of the adjustable archway system 102 and the associated integrated light sources 402, cameras 602 and extension mechanisms 110. Each of the integrated light sources 402, cameras 602 and extension mechanisms 110 are controlled by a controller 702. Power circuitry 704 provides system power for the controller 702, light sources 402, cameras 602 and extension mechanisms 110. The power circuitry 704 connects to a main power grid via a connector 706 for plugging the adjustable archway system 102 into an external power grid. The connector 706 may also provide connections to portable power sources such as generators, batteries, etc.

The controller 702 provides light source control functions 708 for turning on and off integrated light sources 402 and adjusting their brightness based upon varying lighting conditions. OCR (optical character recognition) control functions 710 allows for the control of OCR capabilities 712 that are associated with the cameras 602. The OCR capabilities 712 of the cameras 602 and the OCR function 710 of the controller 702 enable the controller 702 to recognize and process detected labels that are located on a vehicle 400 passing through the adjustable archway system 102. The labels normally provide identification information on the vehicle but may provide other types of information.

Model training 714 implemented within the controller 702 is trained using labels on both white and black backgrounds to enhance accuracy and handle variation in background colors and varying lighting conditions. The model training 714 improves the detection of labels by the cameras 602 and the determination of time status by the cameras. The labels detected by the cameras 602 can contain various information about vehicles that may be useful in associating detected damage with the vehicle. Dynamic exposure adjustment 716 using an algorithm to dynamically adjust the exposure settings of the image is captured by the cameras 602 based upon the brightness of the images captured by the cameras 602.

HDR (high dynamic range) processing functions 718 use algorithms to process captured images from the cameras 602 to ensure high-quality images in varying lighting conditions.

Lot label reading models 720 are trained to read lot labels from the exit camera 602 as the vehicle 400 leaves the adjustable archway system 102 to enable accurate tracking and documentation of vehicles as they complete passage through the archway.

The camera control 722 controls when various cameras 602 take images for performing damage analysis for a vehicle 400. The camera control 722 can work in conjunction with the light source control 708 in order to create a desired exposure for the image that is captured by the camera 602.

Damage detection functionalities 724 use machine learning models to capture images and videos using damage detection algorithms to detect dents, scratches and other damages using deflectometry analysis. Various types of deflectometry analysis such as those mentioned herein above may be utilized.

Archway extension control 726 provides for control of the extension, retraction and locking of the archway extension mechanism 110 and pivot joints 112. These components under the control of the controller 702 to enable an individual to configure the archway system 102 using an interface interaction with the controller.

It will be appreciated by those skilled in the art having the benefit of this disclosure that this adjustable archway system with integrated lighting, pivot joints and patterned design provides a more efficient manner for scanning a variety of different vehicle sizes. It should be understood that the drawings and detailed description herein are to be regarded in an illustrative rather than a restrictive manner and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An adjustable archway system, comprising:
a main frame defining an archway through which a vehicle may pass, wherein the main frame further comprises:
a plurality of vertical members;
at least one horizontal member interconnecting a pair of vertical members of the plurality of vertical members;
a plurality of pivot joints, each pivot joint of the plurality of pivot joints interconnecting a vertical member with a horizontal member, wherein the plurality of pivot joints are configured to enable 360 degrees of movement between the vertical member and the horizontal member;
an extension mechanism integrated within the main frame configured to adjust a height and width of the main frame to a plurality of positions;
a plurality of cameras mounted the main frame for capturing images of the vehicle passing through the archway of the main frame; and
a controller configured to operate the extension mechanism to move between the plurality of positions of the main frame.

2. The adjustable archway system of claim 1, wherein at least one vertical member of the plurality of vertical members further comprises:
a light source to illuminate surfaces of the vehicle passing through the archway of the main frame located on a first half of a face of the at least one vertical member responsive to a control signal from the controller; and
a plurality of vertical lines located on a second half of the face of the at least one vertical member adjacent to the first half, the plurality of vertical lines for reflecting off of the surfaces of the vehicle passing through the archway of the main frame.

3. The adjustable archway system of claim 1, wherein the plurality of cameras further comprises:
a first portion of the plurality of cameras located in top corners of the main frame for capturing the images of the vehicle passing through the archway of the main frame;
a second portion of the plurality of cameras located to capture the images of tires of the vehicle passing through the archway of the main frame; and
a third portion of the plurality of cameras for capturing the images of labels located on the vehicle passing through the archway of the main frame.

4. The adjustable archway system of claim 1, wherein at least a portion of the plurality of cameras includes OCR (optical character recognition) capabilities for recognizing labels located on the vehicle passing through the archway of the main frame.

5. The adjustable archway system of claim 1, wherein the controller is further configured to detect damage to the vehicle using deflectometry responsive to the images captured by the plurality of cameras.

6. The adjustable archway system of claim 1, wherein the controller is further configured to adjust exposure settings of the plurality of cameras responsive to brightness of the images captured by the plurality of cameras.

7. The adjustable archway system of claim 1, wherein the controller is further configured to process the images captured by the plurality of cameras with a high dynamic range algorithm to improve image quality in varying light conditions.

8. The adjustable archway system of claim 1 further comprising a locking system for locking the main frame into a fixed position.

9. The adjustable archway system of claim 1 further comprising dimension indicators configured to provide a visual indication of a size of an opening defined by the main frame and the height and width of the main frame.

10. An adjustable archway system, comprising:
a main frame defining an archway through which a vehicle may pass comprising:
a plurality of vertical members;

at least one horizontal member interconnecting a pair of vertical members of the plurality of vertical members;

a plurality of pivot joints, each pivot joint of the plurality of pivot joints interconnecting a vertical member with a horizontal member, wherein the plurality of pivot joints are configured to enable 360 degrees of movement between the vertical member and the horizontal member;

a first plurality of extension mechanisms integrated within the plurality of vertical members configured to adjust a height of the main frame to a first plurality of positions;

a second plurality of extension mechanisms integrated within the at least one horizontal member configured to adjust a width of the main frame to a second plurality of positions;

a light source associated with at least one vertical member of the plurality of vertical members to illuminate surfaces of the vehicle passing through the archway of the main frame located on a first half of a face of the at least one vertical member;

a plurality of vertical lines located on a second half of the face of the at least one vertical member and adjacent to the first half, the plurality of vertical lines for reflecting off of the surfaces of the vehicle passing through the archway of the main frame;

a plurality of cameras mounted the main frame for capturing images of the vehicle passing through the archway of the main frame; and a controller configured to operate the first and the second plurality of extension mechanisms to move between the first and the second plurality of positions of the main frame.

11. The adjustable archway system of claim 10, wherein the plurality of cameras further comprises:

a first portion of the plurality of cameras located in top corners of the main frame for capturing the images of the vehicle passing through the archway of the main frame;

a second portion of the plurality of cameras located to capture the images of tires of the vehicle passing through the archway of the main frame; and a third portion of the plurality of cameras for capturing the images of labels located on the vehicle passing through the archway of the main frame.

12. The adjustable archway system of claim 10, wherein at least a portion of the plurality of cameras includes OCR (optical character recognition) capabilities for recognizing labels located on the vehicle passing through the archway of the main frame.

13. The adjustable archway system of claim 10, wherein the controller is further configured to detect damage to the vehicle using deflectometry responsive to the images captured by the plurality of cameras.

14. The adjustable archway system of claim 10, wherein the controller is further configured to adjust exposure settings of the plurality of cameras responsive to brightness of the images captured by the plurality of cameras.

15. The adjustable archway system of claim 10, wherein the controller is further configured to process the images captured by the plurality of cameras with a high dynamic range algorithm to improve image quality in varying light conditions.

16. The adjustable archway system of claim 10 further comprising dimension indicators configured to provide a visual indication of a size of an opening defined by the main frame and the height and the width of the main frame.

17. An adjustable archway system, comprising:

a main frame defining an archway through which a vehicle may pass, wherein the main frame further comprises:

a plurality of vertical members;

at least one horizontal member interconnecting a pair of vertical members of the plurality of vertical members;

a plurality of pivot joints, each pivot joint of the plurality of pivot joints interconnecting a vertical member with a horizontal member, wherein the plurality of pivot joints are configured to enable 360 degrees of movement between the vertical member and the horizontal member;

an extension mechanism integrated within the main frame configured to adjust a height and width of the main frame to a plurality of positions;

dimension indicators configured to provide a visual indication of a size of an opening defined by the main frame and the height and width of the main frame;

a plurality of cameras mounted the main frame for capturing images of the vehicle passing through the archway of the main frame; and a controller configured to:

operate the extension mechanism to move between the plurality of positions of the main frame;

detect damage to the vehicle using deflectometry responsive to the images captured by the plurality of cameras;

adjust exposure settings of the plurality of cameras responsive to brightness of the images captured by the plurality of cameras; and process the images captured by the plurality of cameras with a high dynamic range algorithm to improve image quality in varying light conditions.

18. The adjustable archway system of claim 17, wherein at least one vertical member of the plurality of vertical members further comprises:

a light source associated with at least one vertical member of the plurality of vertical members to illuminate surfaces of the vehicle passing through the archway of the main frame responsive to a control signal from the controller and located on a first half of a face of the main frame; and a plurality of vertical lines located on a second half of the face of the main frame adjacent to the first half next to the light source, the plurality of vertical lines for reflecting off of the surfaces of the vehicle passing through the archway of the main frame.

19. The adjustable archway system of claim 17, wherein at least a portion of the plurality of cameras includes OCR (optical character recognition) capabilities for recognizing labels located on the vehicle passing through the archway of the main frame.

* * * * *